UNITED STATES PATENT OFFICE.

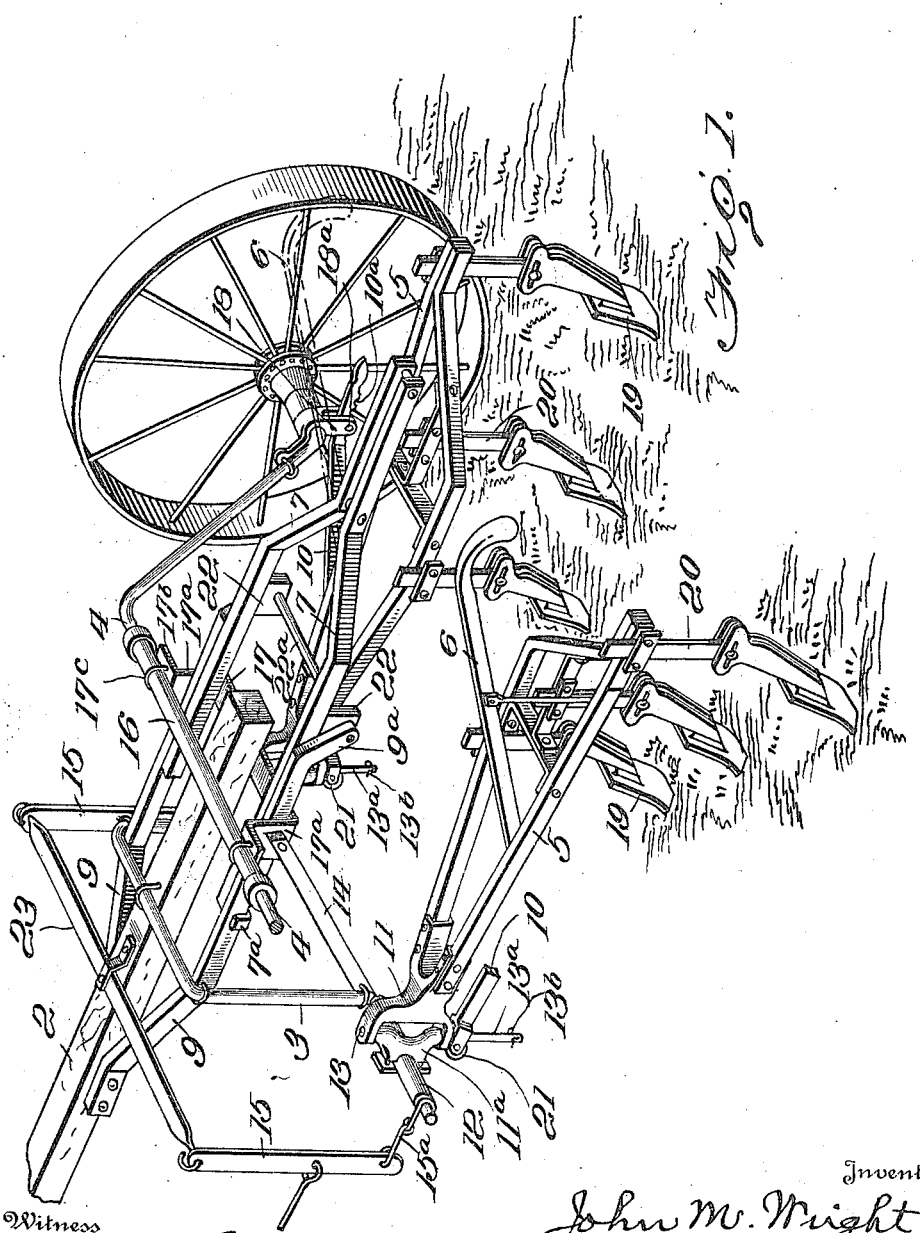

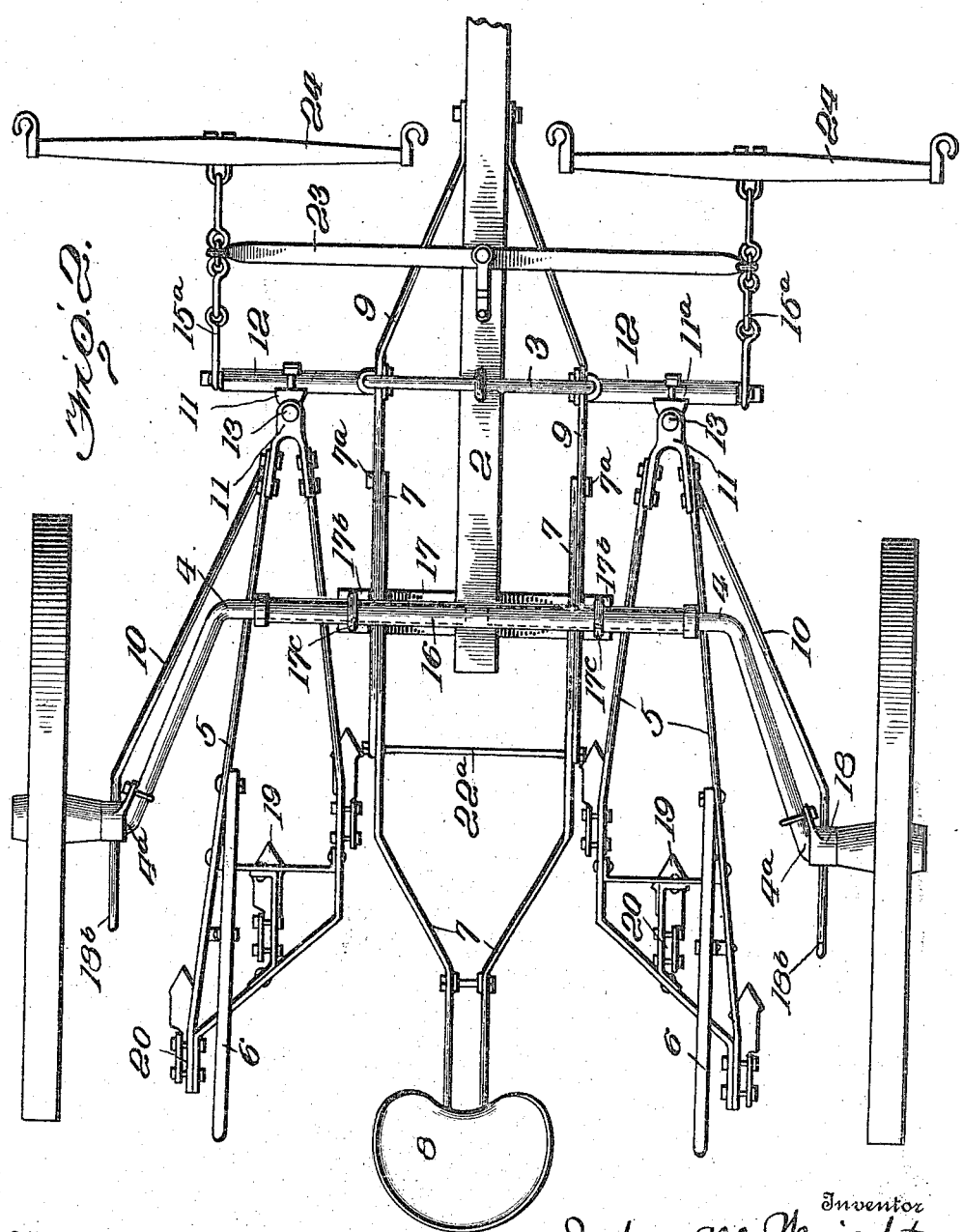

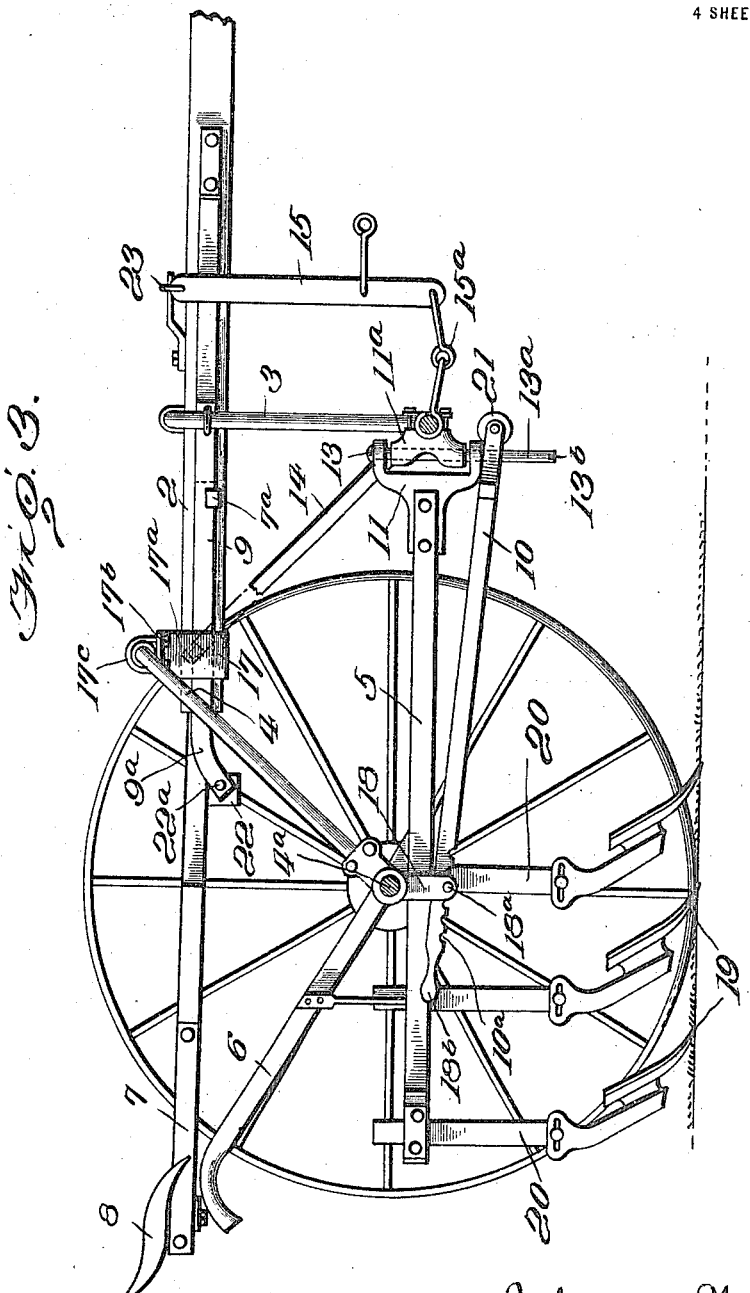

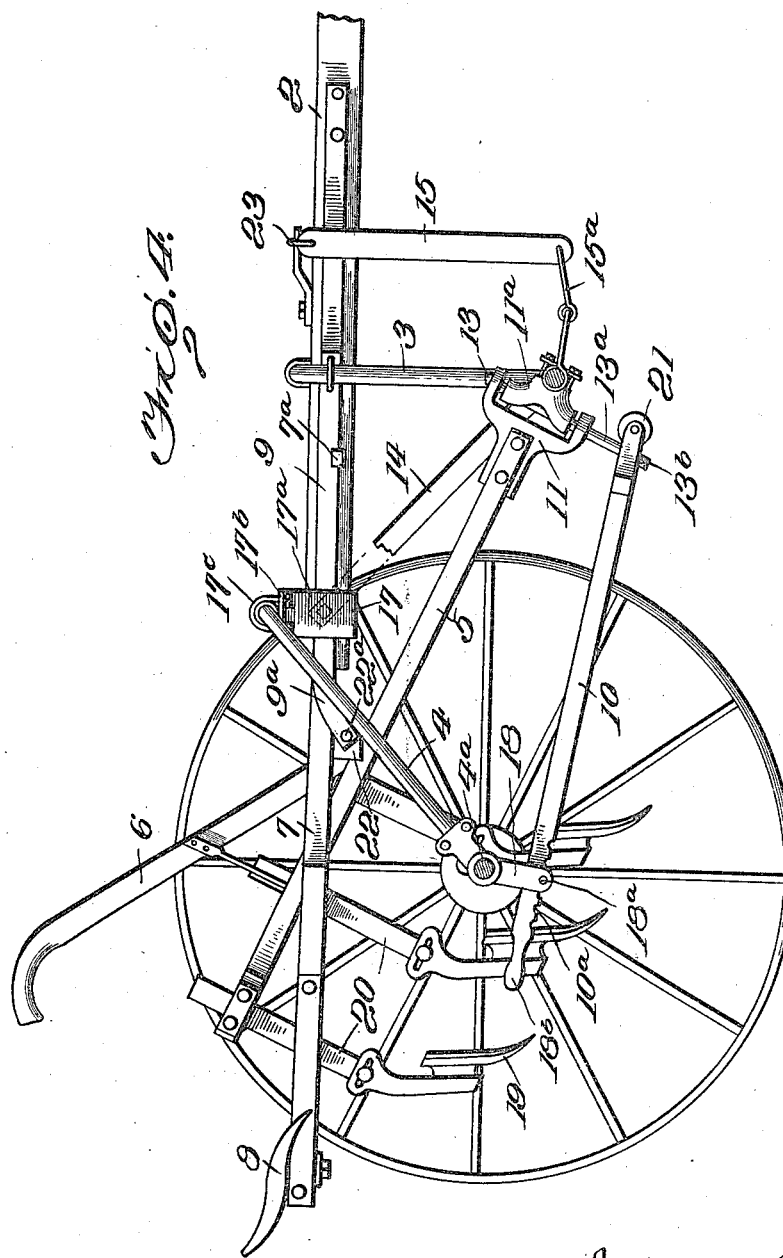

JOHN M. WRIGHT, OF BRAINARD, NEBRASKA, ASSIGNOR TO DEMPSTER MILL MANUFACTURING COMPANY, OF BEATRICE, NEBRASKA, A CORPORATION OF NEBRASKA.

CULTIVATOR.

1,280,353.      Specification of Letters Patent.      Patented Oct. 1, 1918.

Application filed May 15, 1917. Serial No. 168,773.

*To all whom it may concern:*

Be it known that I, JOHN M. WRIGHT, a citizen of the United States, and resident of Brainard, county of Butler, and State of Nebraska, have invented certain new and useful Improvements in and Relating to Cultivators and the like, of which the following is a specification.

This invention relates to certain improvements in wheeled cultivators and the like; and the objects and nature of the invention will be readily understood by those skilled in the art in the light of the following explanation of the accompanying drawings showing what I now believe to be the preferred mechanical expression or embodiment from among other constructions and arrangements within the spirit and scope thereof.

An object of the invention is to reduce to the minimum, the drop or downward movement of the frame and operator, when the shovel beams of a wheeled riding cultivator are lifted out of the ground.

A further object of the invention is to provide a wheeled riding cultivator having vertically movable shovel beams and a seat and frame structure wherein the driver approximately counterbalances the front portion of the frame, with a structure and arrangement whereby vertical movement of the frame and seat when the shovel beams enter and are lifted out of the ground, is reduced to the minimum.

A further object of the invention is to provide a wheeled riding cultivator having a vertically movable shovel beam with draft connections so arranged as to automatically aid in lifting the beams.

A further object of the invention is to provide a wheeled cultivator having vertically movable shovel beams, with draft connections constructed and arranged to automatically increase and decrease the lifting leverage of the draft connection on said beams when the beams are being raised and lowered.

A further object of the invention is to provide improvements in the coupling arrangements betwen the draft connections connecting the shovel beam couplings and the axle of wheeled cultivators, whereby the leverage of the draft connections on the beams will not be automatically variable.

A further object of the invention is to provide operative connections between the shovel beam couplings of wheeled riding cultivators and the draft bars extending to the wheel axle, with said connections arranged below the horizontal axes on which said couplings swing vertically with the beams to exert lifting action on said beams.

A further object of the invention is to provide certain improvements in wheeled riding cultivators wherein the weight of the rider constantly tends to depress the frame and increase the distance between the shovel beam couplings and the wheel axis, whereby the weight of the rider will be automatically utilized to aid in lifting the shovels out of the ground, and whereby the necessary drop of the frame and rider when the shovel beams are lifted, will be reduced to the minimum.

A further object of the invention is to provide certain improvements in combinations and arrangements for the production of a highly advantageous and efficient riding wheeled cultivator.

The invention consists in certain novel features in construction and in combinations and arrangements as more fully and particularly set forth and pointed out hereinafter.

Referring to the accompanying drawings:—

Figure 1, is a perspective view of the implement of my invention, the seat and one of the supporting wheels not being shown.

Fig. 2, is a plan of the implement.

Fig. 3, is a side elevation, the axle being broken away and one supporting wheel not being shown, the parts being shown in normal operative positions.

Fig. 4, is a view similar to Fig. 3, but showing the parts elevated from normal operative positions.

In the particular embodiment illustrated, I show a main frame comprising a stiff elevated longitudinal center tongue 2, at its rear end resting and fixedly held down on the central portion of a transverse or cross member 17, consisting of a strong elongated horizontal metal plate having upstanding or vertical ends 17ᵃ, with their top extremities bent outwardly to horizontal positions and forming supports 17ᵇ, elevated above the frame, and spaced longitudinal side or frame bars 9.

The tongue is arranged approximately midway between these bars, which converge at their front ends and are there bolted or otherwise fixed to a rearward portion of the tongue. The main parallel portions of the bars extend rearwardly over the ends of the cross member 17 and are bolted or otherwise fixed to the upstanding portions 17ª thereof, while the rear end portions of the bars extend rearwardly beyond the cross member 17, and preferably terminate in downwardly deflected ends 9ª carrying seat bar supporting and adjusting means. The stationary elongated axle sleeve 16, is arranged transversely of the frame bars 9 and the tongue 2, and parallel with and directly above the cross member 17. This sleeve is fixedly secured down on the elevated supports 17ᵇ by clips 17ᶜ, and is thus held in an elevated position above the tongue and frame bars. The straight elevated central portion of the arched or crank axle 4, extends longitudinally through and is rotatively mounted in said sleeve and the opposite end shanks or crank arms of said axle extend downwardly and rearwardly at an inclination from said elevated central portion and at their lower rear ends are turned outwardly to form the alined axle spindles 4ª on which the ground or supporting wheels 1 are mounted.

The operator's seat 8, is arranged a distance in rear of the vertical plane in which the wheel axes are located, and said seat is carried by a suitable support forming a longitudinal rearward extension of the main frame of the cultivator. This support comprises a pair of rigidly connected seat bars 7 the parallel front portions of which extend forwardly at the inner side faces of the longitudinal frame bars 9, and beneath the axle sleeve 16 and over the cross member 17. At their front ends, the seat bars 7 are provided with lateral stops or projections 7ª extending outwardly under the frame bars 9 and abutting the lower edges thereof. Intermediate their lengths, the seat bars rest on supporting blocks 22, arranged at the inner side faces of the depending rear ends of the frame bars 9. The seat bars loosely engage the frame bars and said blocks and said seat bars can slide longitudinally of the frame bars to move the seat forwardly or rearwardly in adjusting the parts so that the weight of the rider will aproximately counterbalance the front part of the machine. In other words, when the rider is in his seat, the machine is approximately balanced on the alined wheel axes. Means are also provided for adjusting the seat vertically with respect to the cultivator frame to suit different operators. For instance, I show the supporting blocks 22 carried by and rotatively mounted on a cross bolt 22ª, carried by the depending ends of the frame bars and provided with clamping means such as nuts and a spacing sleeve whereby the blocks can be clamped in position. Each block is rectangular having its four edges arranged at different distances from the bolt hole receiving said bolt.

The seat bars rest on and are supported by the top edges of the blocks, and hence said bars can be held at different elevations by rotating the blocks to vary the elevation of their top edges.

At the front of the main frame, I show an evener bar 23, extending across and pivotally joined to the tongue and having pull standards 15, pivotally joined to and depending from its ends. I also show swingletrees 24, coupled to intermediate portions of the pull standards.

At a distance in rear of the evener, I provide the beam arch 3 at its elevated central portion extending over and fixed to the tongue and also extending over the frame side bars 9, and depending at the outer sides thereof and rigidly clipped or otherwise secured thereto. The lower ends of the beam arch 3 project horizontally and outwardly in opposite directions for coupling to the shovel beams, and at their outer extremities receive the loose or flexible pull connections 15ª, from the lower ends of the pull standards 15.

The frame and beam arch are braced and stiffened by inclined braces 14 at their upper ends bolted or otherwise secured to the upstanding portions 17ª of the frame cross member 17, and at their lower ends bolted or otherwise secured to the lower parts of the vertical legs of the arch.

In the example illustrated, I show a pair of independently movable gangs or shovel (cultivator or plow) beams 5, provided with any suitable standards 20, carrying any suitable implements such as shovels 19. These beams are also provided with means whereby the beams can be independently guided and swung lateraly and vertically by the rider from his seat 8, and such means comprise handles 6.

The beams are coupled to the lower horizontal portions, respectively, of the beam arch to permit vertical and lateral swing, and various coupling devices can be provided for this purpose.

As an example, I show each coupling comprising an elongated horizontal sleeve 12, rotatively confined on a lower horizontal arm of the beam arch, having vertically disposed coupling member 11ª, clipped or otherwise fixed to the central portion of and arranged behind the sleeve, the vertically disposed coupling member 11 fixed to and forming the front end or nose of the gang, and the vertical coupling pin 13 uniting coupling members 11ª, 11 against independent vertical movement and permitting independent lateral swing of the beam and member 11 with respect to member 11ª.

When the beam is swung vertically the coupling members 11, 11ª, move together as a longitudinal continuation of the beam, and the sleeve 12 rotates on the beam arch arm which constitutes the horizontal axis on which the beam swings. When the beam swings laterally or horizontally, the coupling pin 13 constitutes the vertical axis on which the beam swings. In the example illustrated, the coupling member 11ª is formed with an elongated vertical bore while the coupling member 11 is forked to provide upper and lower eyes above and below and registering with the bore to receive the coupling pin. The coupling pin is elongated to provide an extension 13ª depending a distance below the lower eye of member 11, and the lower end of the pin is provided with a laterally projecting stop 13ᵇ.

Suitable draft connections are provided between the draft devices to the beams and the lower end portions of the arched axle to maintain the desired relation or position of the wheel axis with respect to the axial line on which the sleeves 12 rotate and consequently to determine the elevation of the cultivator frame. As means which advantageously perform this function, I show draft bars 10 forked at their front ends and loosely straddling the depending ends 13ª of the coupling pins and carrying grooved rolls 21, mounted in the front ends of the forks and bearing against the front sides of said depending pin ends and adapted to travel vertically thereon, while the rear portions of these draft bars extend loosely through vertically elongated yokes or guideways 18 fixed to and depending from the horizontal lower arms or spindles of the axle inwardly beyond the wheel hubs and at their lower ends having cross pins or stops 18ª.

Each draft bar has a longitudinal series of notches 10ª, in its lower edge any one of which is adapted to receive the cross portion 18ª of the yoke receiving said bar. The rear ends of the draft bars can form handles 18ᵇ projecting rearwardly beyond the yokes. Each draft bar can be raised in its yoke to disengage its notches from pin 18ª, and the wheels can then be moved forwardly or rearwardly, (the axle rotates in sleeve 16 as the arms or shanks thereof swing forwardly or rearwardly to raise or permit lowering of the frame as the wheels advance or move back) and the draft bars can then be dropped so that notches thereof will receive pins 18ª and lock the parts in the desired normal adjustment.

In this connection it will be noted, that the elevation (distance above the ground) of the main frame and of the sleeves 12 is determined by the angle or the arched axle crank arms or shanks, by the distance between sleeves 12 and the wheel axis, and that this distance is controlled by the draft bars 10 and the particular notches thereof in which pins 18ª are located. The elevation of the main frame, for normal operation of the machine, can be varied to suit different operators or different conditions, by locating the stop pins 18ª in different notches of the draft bars, as herein before described, to increase or decrease the distance between the wheel axis and sleeves 12. In other words, the elevation of the frame and its seat in normal operation is varied by shortening or lengthening the draft bars.

The pull of the draft animals and the weight of the main frame and parts and the operator carried thereby, constantly tend to force the wheels rearwardly with respect to sleeves 12 through the medium of the arched axle, and permit the frame to drop, but this tendency is resisted by the draft bars 10 which hold the wheels against fore and aft movement independently of the frame, to maintain the predetermined distance for normal operation. When the operator is in his seat 8, the draft bars 10 are under a constant tension or rearward pull which is sufficient to maintain the front ends of the draft bars at the upper ends of the vertical coupling pin extensions 13ª and against the lower eyes of coupling members 11 during normal operation of the machine when the shovel beams are approximately at their lowest position with the shovels in the ground. The rear ends of the draft bars are coupled to the arched axle at points below the wheel axis through the medium of the depending yokes 18 which act as lever or crank arms on the shanks of the axles, axle spindles 4ª then constituting the fulcrums, and hence the yokes 18 swing upwardly as the frame lowers and downwardly and forwardly as the frame is elevated.

The draft rods also, preferably, incline downwardly and forwardly from yokes 18 to the coupling pins and at their front ends are applied to the shovel beam couplings at points below the sleeves 12, through leverage connections embodying the rigid coupling pins and the coupling members 11, 11ª, the alined axes of sleeves 12, constituting the fulcrums for these connections.

During the normal operation of the cultivator, when the shovels are in the ground and the front ends of the draft bars are at their limits of upward movement on the coupling pins where they are held under tension by the rearward pull of the arched axle on said bars by reason of the tendency of said bars to move up to the direct line of strain from sleeves 12 to the wheel axis, said bars exert a certain lifting action on the shovel beams. However, this leverage action on the shovel beams is not objectionable but on the contrary is beneficial in tending to counterbalance said beams without lifting the shovels out of the ground or interfering with the proper operation thereof or increasing the effort of the operator in maintaining the shovel beams in proper operative position. However, the instant the operator begins to lift or swing the shovel beams upwardly, the coupling pins swing therewith and begin to tilt from the vertical, and the rearward pull of the draft bars on said pins constitutes a substantial aid and assistance to the operator in elevating the shovel beams relieving him of much weight and effort. As the shovel beams swing upwardly, the depending ends of the coupling pins incline downwardly and rearwardly, shortening the distance between the portions of said pins below coupling members 11$^a$ and the wheel axis, and hence permitting the rollers 21 to travel downwardly on said pins under the constant pull of the draft bars, until the front ends of said bars engage the stops 13$^b$, thereby constantly and automatically increasing the leverage of the beam lifting action of the draft bars, as the beams swing upwardly.

When the coupling pins begin to tilt as the shovel beams are lifted, the cultivator frame starts to drop and the wheels begin to move rearwardly because the constantly increasing tilt of the coupling pins gradually shortens the distance between the axis of sleeves 12 and the wheel centers and hence permits rearward movement of the draft bars, and the weight of the cultivator frame and operator keep the draft bars under constant rearward pull or tension on the coupling pins with a consequent lifting action on the shovel beams. As the beams swing up the lifting leverage of the draft bars on said beams constantly increases because the rollers 21 travel down said pins as the inclination of the pins increases.

When the shovel beams are depressed and again forced into the ground, the coupling pins swing forwardly toward the vertical position and consequently tend to gradually increase the distance between the sleeves 12 and the wheel axis and hence the draft bars are drawn forwardly and placed under a forward tension which swings the arms of the arched axle forwardly to elevate the cultivator frame to normal position and move the wheels forwardly. As the coupling pins thus swing forwardly, the rollers of the draft bars travel upwardly on the coupling pins and consequently cause said bars to swing upwardly and constantly and automatically decrease the lifting leverage of said bars on the beams until the beams reach their lowermost positions with the shovels in the ground, and the draft bars reach their uppermost positions against the lower eyes of coupling members 11 in which positions the lifting leverage action of the bars on the beams is at the minimum.

It will be noted that the cultivator frame is suspended from the arched axle, that the axis on which the arched axle swings is elevated a distance above the frame, and that hence I am enabled to provide extremely long axle shanks or arms inclined rearwardly and downwardly at a great angle from the perpendicular, locating the wheel axis at a considerable distance in rear of the vertical plane in which the axis on which the axle swings is located. Material advantages are thereby attained inasmuch as the vertical distance of travel of the cultivator frame when the shovel beams are raised and lowered, is reduced to the minimum. It is exceedingly desirable in cultivators or other farm tools of this general type, to reduce to the minimum the distance the cultivator frame drops when the shovel beams are elevated, and consequently to reduce to the minimum the distance the cultivator frame and its seat must be elevated when the shovel beams are forced down to carry the shovels into the ground.

I do not wish to limit my invention to the particular cultivator draft devices illustrated, nor to the tongue type of farm tool, and it is evident that various changes, modifications and variations might be resorted to without departing from the spirit and scope of my invention and hence I do not wish to limit myself to the exact disclosures hereof.

What I claim is:—

1. In a cultivator, in combination, a central longitudinal tongue, frame bars fixed thereto and extending rearwardly at opposite sides thereof, a cross member beneath said tongue and bars and fixed thereto and having upstanding ends, a seat support extending rearwardly from said bars and provided with a rear seat, an arched axle embodying elongated inclined depending shanks provided with ground wheels, supports fixed on said upstanding ends and suspending said frame bars and tongue from said axle and rendering said shanks vertically swingable on a transverse axis arranged a substantial distance above said frame bars and tongue, a beam arch fixed to said frame bars, vertically swingable plow beams having couplings confined to and rotatable on the lower ends of said beam arch, draft appliances applied to said beam arch, and draft bars having direct plow-beam-lifting connection with said plow beam couplings and extending therefrom to said shanks to control the swing thereof.

2. In a cultivator, in combination, a longitudinal main frame provided with and carrying a rearwardly extending seat support having a seat, an arched axle having elongated inclined depending shanks at their lower ends provided with supporting wheels, supporting means suspending said main frame from said axle and providing a transverse axis a substantial distance above said frame and seat support on which said shanks swing vertically, whereby the weight of the frame and its load tends to swing the shanks and force the wheels rearwardly with a relatively short drop of the frame and its seat support, vertically swingable plow beams, couplings connecting the front ends of the beams to the frame, and draft bars extending forwardly from the shanks and having leverage connection with said plow beams, the draft being applied to the shanks through said bars, said bars controlling the swing of said shanks, the tendency of the shanks to swing rearwardly under the weight of the frame being applied to aid in lifting the plow beams through the medium of said draft bars and leverage connection.

3. In a cultivator, in combination, a central longitudinal tongue, frame bars fixed thereto and extending rearwardly at opposite sides thereof, a cross member beneath said tongue and bars and fixed thereto and having upstanding ends, a seat support extending rearwardly from said bars and provided with a rear seat, an arched axle embodying elongated inclined depending shanks provided with ground wheels, supports fixed on said upstanding ends and suspending said frame bars and tongue from said axle and rendering said shanks vertically swingable on a transverse axis arranged a substantial distance above said frame bars and tongue, draft bars applied to said shanks and controlling the swing thereof, and vertically swingable plow beams.

4. In combination, a frame, a swingable arched axle provided with frame supporting wheels, the weight of the frame and its load constantly tending to swing said axle and move the wheels and permit the frame to drop, a vertically-swingable implement beam coupled to the frame, and an automatic variable beam-lifting leverage connection between the axle and beam.

5. In combination, a balanced riding wheeled cultivator frame, a vertically movable shovel beam coupled to the frame, draft devices controlling the vertical movement of said frame, and having automatically variable-leverage operative connection with said beam to exert lifting action thereon.

6. In combination, a riding wheeled cultivator frame, a swingable arched axle upholding said frame and provided with supporting wheels, a vertically-swingable shovel beam coupled to the frame, and a draft bar coupled to the axle, operative leverage connection with said beam for exerting lifting pull on said beam through the medium of said connection to aid the operator in lifting said beam, said beam when being depressed exerting pull on said bar through said leverage connection to swing the axle and elevate the frame, said leverage automatically increasing as said beam is swung up from its operative lowermost position and automatically decreasing as said beam is forced down from elevated position to operative position.

7. In combination, a riding wheeled cultivator frame, a swinging arched axle upholding said frame and provided with supporting wheels, a vertically swingable shovel beam coupled to the frame and provided with a vertically elongated leverage extension, and a draft bar coupled to the axle to control the swing thereof and sustain the same against the weight of the frame and its load and having rolling connection with said extension to exert lifting pull on said beam and to automatically roll down the extension as the beam is swung upwardly and up said extension as the beam is forced downwardly.

8. In combination, in a wheeled riding straddle-row cultivator, a main frame, frame supporting mechanism arranged to permit said frame to drop under the weight of its load, vertically-swingable shovel beams coupled to said frame, and means normally holding said mechanism in operative position supporting said frame in elevated position, said means embodying automatically-variable leverage connections with said beams exerting lifting action on said beams under the weight of the frame and its load.

9. In combination, in a wheeled riding straddle-row cultivator, a main frame provided with the operator's seat, frame supporting mechanism movably arranged to permit downward movement of the frame under the weight of its load, vertically-swingable cultivator beams, coupling devices between said beams and the frame and through which said beams are drawn forward with the frame, and draft devices from said mechanism to the frame through said coupling devices and normally holding said mechanism to maintain the frame elevated, said draft devices being maintained under tension by the weight of said frame and its load and thereby maintaining a lifting pull on said beams through the medium of said couplings, said draft devices having automatically shifting connection with said couplings to increase the lifting pull on the beams as the beams are elevated and to decrease the lifting pull on the beams as the beams are depressed.

10. In combination, a wheeled cultivator main frame provided with the operator's seat, frame upholding mechanism, a vertically-movable shovel beam coupled to the frame and receiving its draft therefrom, and draft devices normally holding said mechanism to maintain the frame in elevated position, said devices having leverage connection with said beam and exerting lifting pull thereon under the weight of the frame and its load, said connection being variable to automatically increase the lifting leverage of the devices on the beam as the beam is elevated and to automatically decrease the lifting leverage of the devices on the beam as the beam is depressed, the movement of said devices with respect to said mechanism being controlled by the vertical position of said beam.

11. In combination, a main frame, a swingable arched axle upholding the frame and provided with supporting wheels, a vertically swingable shovel beam coupled to the frame and having a vertically disposed guideway swingable therewith, and a draft bar controlling the swing of said axle and the elevation of the frame and provided with a roller confined to and vertically movable on said guideway, substantially as described.

12. In combination, a riding wheeled cultivator main frame, a swingable arched axle upholding the same and provided with supporting wheels, a vertically swingable shovel beam coupled to the frame, a depending lever arm swinging with the beam, and a draft bar controlling the swing of the axle and having rolling connection with said lever arm.

13. In combination, a riding wheeled cultivator main frame, a swingable arched axle upholding the same and provided with supporting wheels, vertically swingable shovel beams, coupling devices between said beams and the frame and each embodying an elongated vertically disposed coupling pin, and draft bars controlling the swing of the axle and at their front ends confined to said pins and movable longitudinally thereof as the beams swing vertically.

14. In combination, a wheeled cultivator main frame, a swingable arched axle upholding the same and provided with supporting wheels, vertically-swingable shovel beams coupled to the frame and having depending lever arms, said axle having portions depending below the axial line of the wheels, and draft bars having operative connection with said axle portions and at their front ends directly coupled to said lever arms of the beams to exert lifting pull thereon.

15. In combination, a wheeled cultivator main frame having a horizontal axis to which the draft is applied, mechanism for upholding the frame, said mechanism being movable to permit limited drop of the frame under the weight of its load and to raise the frame to normal elevated position, a shovel beam, and a coupling between said beam and said axis and on which the beam is swingable vertically, said coupling embodying a pin arranged to one side of said axis and depending below the horizontal plane including said axis and forming an elongated guideway and lever member rigid with the beam on vertical swing and having a lower end stop, said mechanism embodying a draft bar maintained under longitudinal pull by the weight of the frame and having a yoke or fork loosely receiving said pin and a roller bearing thereon and movable longitudinally thereof as the beam swings vertically.

16. In combination, in a riding wheeled cultivator, a main frame, vertically and laterally swingable shovel beams, couplings between the front ends of said beams and the frame and swingable vertically with the beams, each coupling embodying a vertically disposed coupling pin, rigid therewith, and frame upholding draft bars at their front ends operatively connected to said coupling pins.

17. In combination, a riding wheeled cultivator frame, supporting wheels on which the frame is adapted to be balanced by the weight of the operator, said frame comprising spaced longitudinal frame bars, and a seat support forming a longitudinal rearward continuation of said frame and having a seat at its rear portion, said seat support being slidable longitudinally of said frame bars.

18. In combination, in a riding wheeled cultivator, a horizontally disposed main frame provided with supporting wheels on which the frame is approximately balanced by the weight of the operator, a seat support comprising bars arranged longitudinally of said frame and forming a rearward continuation thereof and at their rear ends provided with the operator's seat, said support being adjustable longitudinally of said frame, and means whereby said support is swingable vertically to vary the elevation of its rear end with respect to said frame.

19. In combination, in a riding wheeled cultivator, main frame longitudinal bars, rotatably adjustable blocks carried by said bars and having edges arranged at different distances from the axis of rotation, and a seat support having a seat and comprising longitudinal bars arranged loosely and slidably beside said frame bars and at their front portions having projections loosely engaging the under edges of the frame bars, said seat support bars resting on and upheld by edges of said blocks.

20. In a cultivator, in combination, a main frame provided with and carrying a rearwardly extending seat support, an arched axle having elongated depending inclined shanks at their lower ends provided with supporting wheels, supporting means suspending said frame from said axle and providing a transverse axis arranged a distance above said frame and on which said shanks are vertically swingable under the weight of the frame and its load, vertically swingable plow beams, each beam having a depending lever member swingable vertically therewith, said axle shanks having rigid extensions depending below the axial line of said wheels, and pull connections operatively connecting said lever members with and applying the draft to said shank extensions and controlling the swing of the shanks under the weight of the frame and exerting lifting action on said beams.

21. In a cultivator, in combination, a main frame provided with a seat, depending inclined axle shanks pivotally joined to and supporting said frame and constantly tending to swing vertically under the weight thereof, said shanks provided at their lower ends with supporting wheels, a beam arch depending from said frame, draft appliances applied to said arch, vertically swingable plow beams coupled to said arch, and pull connections directly and operatively connecting said beams to said shanks and controlling the swing of the shanks and applying the draft thereto and coupled to exert a leverage lifting action on said beams under the weight of the frame.

22. In a cultivator, in combination, a main frame provided with a seat support, depending inclined axle shanks pivotally joined to and upholding said frame and provided with supporting wheels, vertically swingable plow beams coupled to and drawn forward with the frame, and direct pull and leverage draft connections to and controlling the swing of said shanks and operatively connected with said beams to aid in maintaining said beams depressed when in operative position and to aid in lifting said beams when being swung up from operative position, said connections being maintained under constant rearward pull by the weight of the frame and its load.

Signed,

JOHN M. WRIGHT.

Copies of this patent may be obtained for five cents each, by addressing the "Commissioner of Patents, Washington, D. C."